(12) United States Patent
Ritter

(10) Patent No.: US 7,395,031 B1
(45) Date of Patent: Jul. 1, 2008

(54) MOBILE DEVICE AND METHOD FOR RECEIVING AND PROCESSING PROGRAM-ACCOMPANYING DATA

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/857,124

(22) PCT Filed: Dec. 2, 1998

(86) PCT No.: PCT/CH98/00512

§ 371 (c)(1),
(2), (4) Date: Jun. 1, 2001

(87) PCT Pub. No.: WO00/33493

PCT Pub. Date: Jun. 8, 2000

(51) Int. Cl.
*H04Q 7/22* (2006.01)

(52) U.S. Cl. .................. 455/77; 455/150.1; 455/154.1; 455/414.1; 340/998; 348/449; 348/13; 348/460; 342/357; 342/449

(58) Field of Classification Search ....... 455/3.01–3.06, 455/414.1, 414.2, 418, 419, 456.1, 456.3, 455/186.1, 77, 150.1, 154.1, 503, 414, 12.1; 340/996, 988; 342/357, 449, 449.1; 701/213; 709/230; 725/110, 112; 348/13, 460, 449
See application file for complete search history.

(56) References Cited

U.S. PATENT DOCUMENTS

| | | | | |
|---|---|---|---|---|
| 5,303,393 A | * | 4/1994 | Noreen et al. | 455/3.02 |
| 5,432,542 A | * | 7/1995 | Thibadeau et al. | 725/35 |
| 5,627,549 A | * | 5/1997 | Park | 701/300 |
| 5,636,245 A | * | 6/1997 | Ernst et al. | 375/259 |
| 5,654,719 A | * | 8/1997 | Kunii | 342/451 |
| 5,708,478 A | * | 1/1998 | Tognazzini | 348/552 |
| 5,832,223 A | * | 11/1998 | Hara et al. | 725/114 |
| 5,949,492 A | * | 9/1999 | Mankovitz | 348/473 |

(Continued)

FOREIGN PATENT DOCUMENTS

DE     19640735 A1    4/1998

(Continued)

*Primary Examiner*—William Trost
*Assistant Examiner*—Julio Perez
(74) *Attorney, Agent, or Firm*—Oblon, Spivak, McClelland, Maier & Neustadt, P.C.

(57) ABSTRACT

Mobile device (3) and method for receiving and processing program-accompanying digital data, which are transmitted by a radio transmitter (1), for example a DAB transmitter, and of which at least certain comprise location parameters. The mobile device (3) includes a radio receiver (38), which can receive radio programs with program-accompanying digital data, and a position locating module (39) for establishing the current position, for example a GPS receiver. The mobile device (3) further comprises a filter module (37), by means of which, on the basis of the current position, determined by the said position locating module (39), location-specific information can be filtered from the received program-accompanying data, which contain, for example, order numbers, URL addresses or executable program data files. The received program-accompanying data can be filtered moreover by the said filter module (37) on the basis of a user profile (35) stored in the mobile device (3). Location-specific data can be shown on a display (31) of the mobile device (3), can be selected by the user by means of operating elements (32) of the mobile device (3), can be edited and can be further processed through the mobile device (3).

40 Claims, 1 Drawing Sheet

U.S. PATENT DOCUMENTS

| | | | |
|---|---|---|---|
| 5,987,029 A | 11/1999 | Kotani et al. | |
| 6,018,649 A * | 1/2000 | Ruhl | 455/186.1 |
| 6,091,956 A * | 7/2000 | Hollenberg | 455/456.5 |
| 6,122,520 A * | 9/2000 | Want et al. | 455/456.2 |
| 6,167,255 A * | 12/2000 | Kennedy et al. | 455/414.1 |
| 6,256,498 B1 * | 7/2001 | Ludwig | 455/433 |
| 6,282,412 B1 * | 8/2001 | Lyons | 455/186.1 |
| 6,314,094 B1 * | 11/2001 | Boys | 370/352 |
| 6,356,761 B1 * | 3/2002 | Huttunen et al. | 455/456.1 |
| 6,438,561 B1 * | 8/2002 | Israni et al. | 707/104.1 |
| 6,535,743 B1 * | 3/2003 | Kennedy et al. | 455/456.1 |
| 6,539,212 B1 * | 3/2003 | Kamalski | 455/186.1 |
| 6,677,894 B2 * | 1/2004 | Sheynblat et al. | 342/357.1 |
| 2002/0183059 A1 * | 12/2002 | Noreen et al. | 455/427 |

FOREIGN PATENT DOCUMENTS

| | | |
|---|---|---|
| EP | 0731574 A2 | 9/1996 |
| EP | 0814447 A1 | 12/1997 |
| EP | 0817414 A2 | 1/1998 |
| JP | 4-127688 | 4/1992 |
| JP | 8-204661 | 8/1996 |
| JP | 9-51314 | 2/1997 |
| JP | 9-93555 | 4/1997 |
| JP | 9-98473 | 4/1997 |
| JP | 9-214445 | 8/1997 |
| JP | 10-116237 | 5/1998 |
| WO | WO 95/24808 | 9/1995 |
| WO | WO 99/21306 | 4/1999 |

* cited by examiner

MOBILE DEVICE AND METHOD FOR RECEIVING AND PROCESSING PROGRAM-ACCOMPANYING DATA

This application is the National Phase of International Application PCT/CH98/00512 filed Dec. 2, 1998 which designated the U.S. and that International Application was not published under PCT Article 21(2) in English.

BACKGROUND OF THE INVENTION

1. Field of the Invention

This invention relates to a mobile device and a method for receiving and processing program-accompanying data. In particular, this invention relates to a mobile device and a method for receiving and processing program-accompanying digital data which are transmitted by a radio transmitter and at least certain of which contain location parameters.

2. Discussion of the Background

Devices with a radio or television receiver for receiving program-accompanying data and with a display for showing received program-accompanying data are known and are available on the market. Such devices are available, in particular, for DAB digital radio systems (Digital Audio Broadcasting) or for other radio systems such as FM-SWIFT or FM-DARC, or for television receivers with teletext, which typically all operate unidirectionally. Although information can be received and displayed with such devices, a user cannot receive information, however, in a targeted way, relating to subjects selected by him alone and/or information relevant for his current location only.

Described in the European patent application EP 0 259 717 is a method in which program-accompanying data are provided with content-specific codes and are transmitted, for advertising purposes. A user can receive information on one or more subject areas in a targeted way, for example real estate advertising, by programming a portable receiver with the corresponding codes. The method described in EP 0 259 717 offers a user no possibility, however, of receiving data, relating to his current location, with his portable receiver in a targeted way.

BRIEF SUMMARY OF THE INVENTION

Proposed in the patent application DE 196 40 735 is a telematic device for installation in the standardized space on the dashboard of motor vehicles in that an auto radio with an RDS module, a radio telephone as well as a location and navigation system are disposed in a housing. The telematic device described in DE 196 40 735 transmits position indications and destination data to an exchange, which calculates a travel route and transmits this travel route to the telematic device for visual display on a display. The telematic device according to DE 196 40 735 can be provided moreover with a CD ROM and a digital map stored thereon, so that the current vehicle position can be linked and displayed on the digital map on the display. The travel routes calculated by the exchange can likewise be displayed on the digital map on the display in the telematic device according to DE196 40 735. The telematic device according to DE196 40 735 can furthermore be set up in such a way that optimal travel routes are calculated on the basis of the current traffic situation which is received in each case over various location-specific traffic report channels.

Described in the patent publication U.S. Pat. No. 5,432,542 is a system and a method that make it possible to receive in a targeted way location-specific reports which are broadcast over television or radio channels. According to the teaching of U.S. Pat. No. 5,432,542, one or more codes with places of interest for the user are programmed by the user into a terminal which is connected to the corresponding television or radio receiver, so that the received location-specific reports can be filtered in the terminal according to these programmed codes.

It is the object of this invention to propose a new mobile device and a new method of receiving and processing program-accompanying data which make it possible to receive and to process location-specific information in a targeted way.

This object is achieved, according to the present invention, in particular through the elements of the independent claims. Further preferred embodiments follow moreover from the dependent claims and from the description.

This object is achieved in particular by the invention in that a mobile device, for example a mobile radio telephone, a palmtop or a laptop computer, comprising a radio receiver, that can receive radio programs with program-accompanying digital data, at least certain of the received program-accompanying data including location parameters, includes a position locating module and a filter module, the filter module being able to filter location-specific information from the received program-accompanying data on the basis of a current position determined by the position locating module. This has the advantage that a user of this mobile device can be supplied with location-specific information in a targeted way.

In various embodiment variants, the position locating module includes a satellite-based positioning system, for example a receiver for the Global Positioning System (GPS), or a terrestrial positioning system, or it can obtain position indications from a mobile network, for example a GSM or UMTS network.

The mobile device preferably includes a memory module in which a user profile can be stored, on the basis of which user profile received program-accompanying data can be filtered by the said filter module. This has the advantage that the user of the mobile device can filter out certain information in a targeted way out of the received program-accompanying data, it being possible to implement this in combination with the filtering of location-specific information. The user can define, for example in the user profile, certain categories or subject areas in which he is interested, in a targeted way, so that location-specific information on these categories or subject areas can be filtered out for him from the received program-accompanying data. It can also be provided for that the area to be taken into consideration in the filtering of location-specific information can be defined in the user profile, for example the radius around the current location.

The mobile device preferably includes a display on which filtered program-accompanying data can be displayed.

The mobile device preferably includes operating elements by means of which filtered program-accompanying data can be selected and edited.

The mobile device preferably includes a communications module by means of which selected, filtered program-accompanying data can be transmitted to a service center, for example in special short messages such as SMS (Short Message Service) or USSD (Unstructured Supplementary Services Data) messages via a GSM or UMTS network, the service center being, for example, a short message service center (SMSC). This has the advantage that multidirectional communication can be thereby achieved, which is initiated by the unidirectional transmission of program-accompanying data.

In an embodiment variant, at least certain of the received program-accompanying data contain an order number, which includes a product identification and an associated supplier identification, and the said mobile device includes a communications module, by means of which a selected order number is sent to the supplier identified by the said order number, the order number being transmitted to a service center, for example in special short messages such as SMS (Short Message Services) or USSD (Unstructured Supplementary Services Data) via a GSM or UMTS network, the service center being, for example, a short message service center (SMSC), in which service center the order number is linked with user identification data of the user of the said mobile device, and the linked data are transmitted to the said supplier.

In an embodiment variant, at least certain of the received program-accompanying data contain an URL address, and the mobile device includes a communications module, by means of which a resource in the Internet addressed by means of the URL address can be activated.

In an embodiment variant, at least certain of the received program-accompanying data contain executable program data files which can be executed in a processing module of the mobile device.

BRIEF DESCRIPTION OF THE DRAWINGS

One embodiment of the present invention will be described in the following with reference to an example. The example of the embodiment is illustrated by the following attached figures.

DETAILED DESCRIPTION OF THE INVENTION

Figure 1:
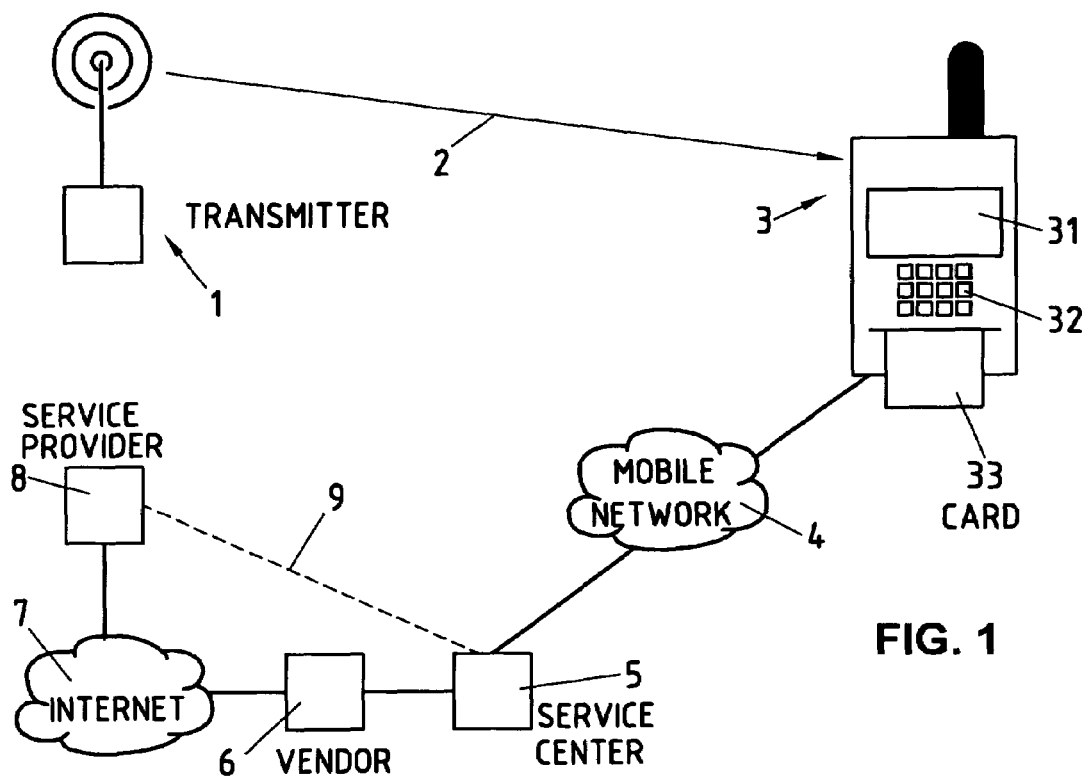
FIG. 1 shows an overall diagram with a radio transmitter and a mobile device, which device is connected to a mobile network, to which a service center with access to service providers is linked.

In the following embodiment example, the reference numeral 1 refers to a radio transmitter, which can transmit program-accompanying data, for example a transmitter of a national or local radio station, or a transmitter for covering a narrowly restricted geographic area, for example trade fair grounds or exhibition premises. The radio transmitter 1 is, for example, an FM transmitter, which can also transmit, in particular, program-accompanying digital data. The transmission of program-accompanying data in addition to the radio program is used above all in the DAB (Digital Audio Broadcasting) radio system or in other radio systems such as FM-SWIFT or FM-DARC. The DAB technology, for example, makes it possible to transmit both radio programs and program-accompanying services (Program Associated Data, PAD). For example, transmission can be by means of DAB data in eight addressable channels with a capacity of 150 kbits each, the addressing of these channels making it possible to transmit data to a separately addressed receiver, to a defined group of several receivers (multicast) or to all receivers (broadcast).

According to the present invention, at least certain of the program-accompanying data transmitted by the radio receiver 1 include location parameters defining a geographic position and/or area for which the respective program-accompanying data are relevant and/or interesting. For example, the location parameters include geographic coordinates defining a particular stand on the grounds of a trade fair or an exhibition, or relating to a particular point of sale and/or sales agent for products and/or services.

As indicated by the unidirectional arrow 2, emerging from the radio transmitter 1, the program-accompanying digital data, for example advertising information on products and/or services or executable program data files, together with any possible audio programs, are disseminated by the transmitter 1 and are received by a mobile device 3 with a corresponding radio receiver 38 (see FIG. 2), for instance. The radio receiver 38 is, for example, a DAB radio receiver or a radio receiver for receiving program-accompanying data according to FM-SWIFT, FM-DARC or another process.

In a possible embodiment, a transmitted and received audio signal is passed on by the radio receiver 38 to an amplifier (not shown), for example an audio amplifier known to one skilled in the art, is amplified thereby, and the amplified electrical signal is applied to one or more loudspeakers (not shown) or to a connecting jack (not shown) for connecting headphones.

Although the embodiment example described relates to a radio transmitter and a radio receiver, it should be mentioned at the very beginning that, in another embodiment variant, instead of a radio transmitter, which transmits audio programs with program-accompanying data, a television transmitter can be used which transmits television programs with program-accompanying data, for example teletext information, which are received by a corresponding television receiver 38, it being possible for the video program to be displayed, for example, on a television screen 31 of a mobile device 3, for example a conventional electronic picture tube, an LCD or plasma display, or via a virtual retina display.

Figure 2:
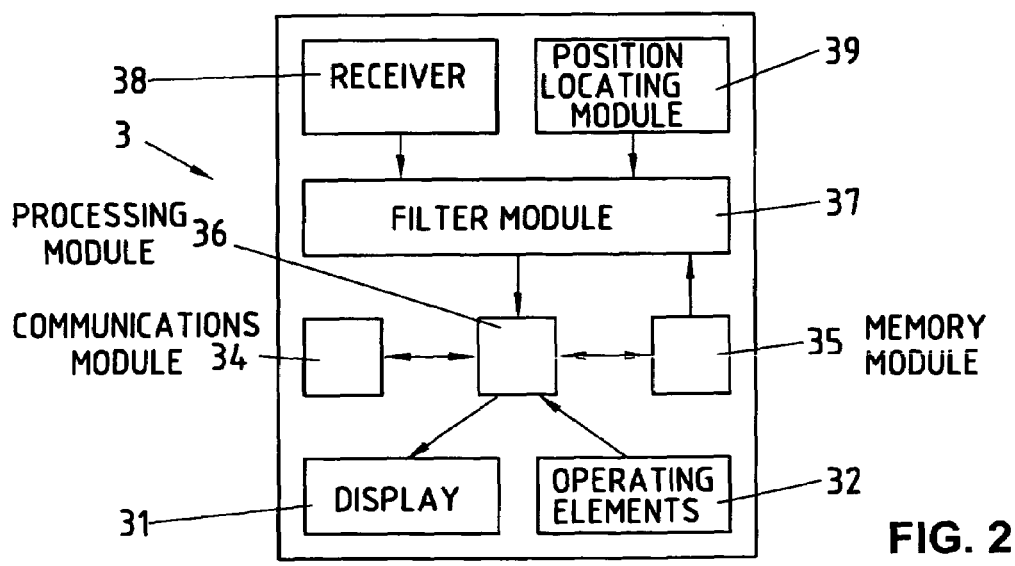
FIG. 2 shows a block diagram of a mobile device with a radio receiver, a position locating module, a filter module, a communications module, a processing module, a memory module, a display, and operating elements.

As shown in FIG. 2, the radio receiver 38 passes on the received program-accompanying digital data, via a schematically indicated connection, to a filter module 37.

According to the present invention, the mobile device 3 has in addition a position locating module 39, which can determine the current geographic position (of the mobile device 3). A determination of position can be carried out, for example, periodically or upon demand, for example upon request of another module of the mobile device 3, for example the filter module 37, or upon request of the user of the mobile device, who enters this as a command by means of operating elements 32, for example, after which the determined current position is displayed for him on a display 31 of the mobile device 3. The position locating module 39 operates, for example, according to a known satellite-based positioning system, in particular the Differential Global Positioning System (GPS), and correspondingly includes a known GPS receiver. In an embodiment variant, the position locating module 39 operates according to a terrestrial positioning system, or it obtains position indications from a mobile network 4. In the latter case, the mobile device 3 is a mobile radio device, which includes a communications module 34 in order to communicate in a mobile network 4, for example a GSM or UMTS network.

As shown in FIG. 2, the position locating module 39 passes on the determined current position to the filter module 37 via a schematically shown connection.

The filter module 37 is a programmed software module, for example, which is implemented in a processor of the mobile device 3 and is stored in a program memory of the mobile device 3. In an embodiment variant, the processor and the program memory for storing and implementing the filter module 37 are located on a chipcard 33 of the mobile device 3, for example an identification card 33 of the mobile device 3, for example a SIM (Subscriber Identification Module) card. The filter module 37 accepts the received program-accompanying data from the radio receiver 38 as well as the determined current position from the position locating module 39, and compares the location parameters contained in the program-accompanying data, for example geographic coordinates, with the current position. If the location parameters and the current position agree, the respective program-accompanying data can be passed on as location-specific information to a processing module 36. There is agreement if, for example, the geographic coordinates of the received location parameters and the determined current position are identical or their difference is within a predefined range that can also be set by the user in a user profile, which user profile will be described more closely below. Program-accompanying data, which contain no location parameters or whose location parameters do not coincide with the current position can be ignored by the filter module 37, for example.

The filter function of the filter module 37 can also be determined in addition by parameters of a user profile stored in a memory module 35. The user profile 35 is, for example, a table with key words, which define, for example, particular categories or subject areas of information in which the respective user is interested. The user profile 35 can also be contained, for example, in the information entered by the user which influences the filtering of location-specific information, for example, the user can define a geographic area, for example a geographic radius which is supposed to be taken into consideration by the filter module 37 in filtering location-specific information depending upon the current position, or the user can switch off the filtering of location-specific information, for example. The user profile 35 can be set up by the user, for example, by means of a corresponding software program in the processing module 36, this software program being able to receive commands entered by the user by means of the operating elements 32 and being able to show entered values, function menus and the contents of the user profile 35 on a display 31 of the mobile device 3. The user profile 35 can also be integrated into an executable program applet, for instance a Java applet, and can be set up externally by the user, for example, and edited, e.g. in a personal computer, an externally defined and/or edited applet being able to be loaded into the mobile device 3, for instance by means of special short messages, e.g. USSD or SMS short messages. As will be described later on, the said processing module 36 includes moreover further software programs and software functions, and is executed on a processor of the mobile device 3 and is stored in a program memory of the mobile device 3. In an embodiment variant, the processor and the program memory for storing and implementing the processing module 36 are located on a chipcard 33 of the mobile device 3, for instance an identification card 33 of the mobile device 3, e.g. an SIM card.

The processing module 36, by means of a software function, receives the location-specific information filtered by the filter module 37, which are moreover limited by the filter module to the information areas set up in the user profile 35, and shows them on the display 31 of the mobile device 3, for example. Corresponding software functions in the processing module 36 receive commands, entered by the user by means of operating elements 32, for browsing through, selecting and/or editing of the displayed, filtered information, and respectively update the information shown on the display 31 corresponding to the entered commands. Depending upon the contents of the filtered program-accompanying data, the processing module 36 shows a menu for data selected by the user on the display 31 with possible further functions for the respective data, or, if only one particular function is up for selection, requires from the user a confirmation as to whether the respective function should be carried out for the selected data.

In particular, received and filtered location-specific data can be passed on, for example by the processing module 36, to a communications module 34 of the mobile device for transmission to a service center 5. The communications module 34 includes, for example, known components in order to communicate in a mobile network 4, for instance a GSM or UMTS network, and in order to transmit in this mobile network 4 special short messages, e.g. SMS or USSD messages. The service center 5 comprises, for example, a known short message service center (SMSC), which is linked to the mobile network 4 and can receive and process short messages transmitted via this mobile network 4. This makes possible, for example, an order or job processing between the communications module 34 and the service center 5 according to the SICAP method, described, inter alia, in the patent publication EP 0 689 368.

In a first application example, the location-specific data contain order numbers for products, services and/or information requests, which include a product identification of the respective products, services or information requests and an associated supplier identification for the respective supplier or service provider. The location-specific order numbers can be used in an ordering method according to the published patent application WO 98/28900, the order number being transmitted by the communications module 34, as described above, to the service center 5, where the order number is linked to identification data, which relate to the user of the mobile device 3 and are obtained from a network database accessible to the service center 5, and being passed on to the supplier 8, or respectively the service provider 8, indicated in the order number. Before transmission of the order number by the communications module 34 to the service center 5, still further information, of significance for the order, can be entered by the user, if applicable, for example the number of items to be ordered and/or indications about payment and mode of payment, and can be transmitted to the service center 5 by the communications module 34 together with the order number. The passing on of the order data by the service center 5 to the service provider 8 can take place, for example, over a fixed network 9, e.g. the public switched telephone network (PSTN) or it can take place via an Internet vendor 6 over the Internet 7. Ordered products and information, such as, for example, executable programs, e.g. Java applets, encrypted admission tokens, for instance for events and functions with automatic access control, as well as requested data from a database can be transmitted by the service provider (supplier) 8, for example directly via the mobile network 4, to the mobile device 3, and correspondingly executed there, stored, or respectively displayed. A corresponding billing of the obtained products, information or services can be carried out via an account of the respective user, this account being located, for example, on a chipcard 33 of the mobile device 3 and containing, for example, a prepaid amount.

In a second application example, the location-specific data contain URL (Universal Resource Locator) addresses, which can be used by the communications module 34 to activate a resource 8 in the Internet 7 addressed through the URL address. This is, for example, a particular web page 8 or a particular home page 8 in the Internet, which is activated by the communications module 34 via the service center 5 and via an Internet vendor 6. The service center 5 includes, for example, a short message service center (SMSC), the respective URL address being transmitted together with corresponding instructions, as described above according to the SICAP method, for example, by the mobile device 3 to the service center 5, and from there through a special service by means of the Internet Protocol (IP) via an Internet vendor 6 to the addressed resource 8 in the Internet 7. The service center 5 can be connected, for example, to the signalling system of the mobile network 4, also be means of suitable components, for instance by means of a Home Location Register (HLR) to the signalling system number 7 (SS7), and have moreover suitable gateway and/or converting functions to activate the resource 8 in the Internet 7 addressed through the URL address by means of the Internet Protocol (IP) via an Internet vendor 6 protocol (IP). The activated resource 8 in the Internet 7 can be shown on the display 31 of the mobile device by means of suitable browser functions of the processing module 36, and can be navigated by the user of the mobile device 3 via the operating elements 32.

In a third application example, the location-specific data contain executable program data files, for example Java applets, which can be executed in the processing module 36 of the mobile device 3. The user of the mobile device can select, for example, via the above-mentioned menu functions, whether a received executable program data file is to be executed right away or whether it is to be just stored in the memory module 35 and is to be executed at a later point in time.

Depending upon the degree of confidentiality of the program-accompanying data, these data can be transmitted, for example with the aid of security services, by the radio transmitter 1 to the mobile device 3, respectively by the mobile device 3 to the service center 5; for this purpose the TTP (Trusted Third Party) method or a PTP (Point-To-Point) method can be used, for instance.

As already indicated above, the received and filtered location-specific data can contain, for example, advertising information concerning a particular stand on the grounds of a trade fair or exhibition premises, or can relate to a particular point of sale and/or sales agent for products and/or services, it being possible for the advertising information to also include described order numbers, for instance. In a further application, the location-specific information can also contain explanations and comments relating to items on exhibition in a museum, given in addition to acoustical information of the audio program or as a substitution for hearing-impaired persons. In a multistoried building, moreover, it can make sense for the program-accompanying data transmitted by the radio transmitter 1 to also include an indication of elevation in the location parameters, and for the position locating module 39 to also include a suitable elevation measuring device, in addition to the described position locating means, in order to also determine the current elevation, so that the filter module 37 described above can also take into consideration the current elevation for filtering location-specific information from the received program-accompanying data. The received and filtered location-specific data can of course also contain other location-specific information, such as, for instance, location-dependent fees, traffic information, orientation indications, for example for road networks and/or vacant parking spaces, weather data, timetables and connection times for public transportation, and much more.

The possibilities for application of the invention described as well as the contents and uses of location-specific information are almost limitless, and in no way restricted just to the examples given.

It should also be mentioned here that the specially equipped mobile device 3, as has been described here, can be achieved in a single comprehensive housing, but is can also be achieved in such a way that it includes a plurality of housings separable from each other, each containing certain modules of the described mobile device, which modules are removably connected to one another via interfaces installed in these housings. In one embodiment example, a first housing includes, for instance, such modules as are contained in a conventional mobile device, e.g. a communications module 34, a display 31 and operating elements 32, whereas a second housing includes modules such as a radio receiver 38 for receiving program-accompanying data, a position locating module 39 and a filter module 37. The above-mentioned interface is, for instance, a suitable interface with contacts or a contactless interface, e.g. an inductive interface, an infrared interface, or in particular a high frequency interface, for instance a so-called "bluetooth" interface, which operates, for example, at 2.4 GHz. One skilled in the art will understand that there are different possibilities for configuration of such modules.

Besides specially equipped mobile devices 3, as have been described here, also various suitable extension modules can be sold and/or rented to an interested user, which extension modules have at least certain of the described special function modules and which can be connected to conventional mobile devices, or for an interested user, who has a mobile device with the suitable hardware modules, suitable software modules for execution of the described method could be loaded into the memory module of this mobile device, in exchange for cash payment.

The invention claimed is:

1. A mobile device, comprising:
   a receiver configured to receive programs and program-accompanying digital data, wherein the programs include at least one of audio data and video data, and the program-accompanying digital data includes geographical location parameters;
   a position locating module configured to determine a current geographic position of the mobile device;
   a filter module configured to filter location-specific information from the program-accompanying digital data based at least on the geographical location parameters and the current geographic position of the mobile device;
   a communications module configured to transmit the location-specific information from the mobile device to a service center; and
   a memory module configured to store a user profile, wherein the filter module is configured to receive the user profile and to filter the location-specific information from the program-accompanying digital data based on the user profile.

2. The mobile device according claim 1, wherein the position locating module includes a satellite-based positioning system or a terrestrial positioning system.

3. The mobile device according to claim 1, further comprising:
   a display configured to receive and display the location-specific information; and operating elements configured to allow selecting and editing of the location-specific information.

4. The mobile device according to claim 1, wherein,
   the location-specific information includes an URL address, and
   the communications module is further configured to activate a resource in the Internet based on the URL address.

5. The mobile device according to claim 1, further comprising:
   a processing module configured to execute program data files included in the location-specific information.

6. The mobile device of claim 1, wherein the filter module is configured to:
   determine if a difference between the geographical location parameters and the current geographic position is within a predefined range, and
   filter the location-specific information from the program-accompanying digital data when the difference between the geographical location parameters and the current geographic position is within the predefined range.

7. The mobile device of claim 1, wherein the position locating module is configured to obtain position indications from a mobile network.

8. The mobile device of claim 1, wherein the programs include radio programs or television programs.

9. The mobile device of claim 1, wherein the memory module includes a removable chipcard.

10. The mobile device of claim 1, wherein the communications module is configured to transmit the data from the mobile device in accordance with a short message protocol.

11. The mobile device of claim 1, wherein the memory module includes a removable data storage medium.

12. The mobile device of claim 1, further comprising:
   a card slot configured to receive a memory card.

13. The mobile device of claim 1, further comprising:
   a headphone jack configured to output an audio portion of the programs.

14. The mobile device of claim 1, further comprising:
   a portable housing, including said receiver, said position locating module, said filter module and said communication module.

15. The mobile device of claim 14, wherein the portable housing is configured as one of a mobile telephone housing, a handheld computer housing, or a portable computer housing.

16. The mobile device of claim 1, wherein
   the location-specific information includes an identifier for at least one product, service and information request.

17. The mobile device of claim 1, further comprising:
   a processing module configured to,
      compare the geographical location parameters of the program-accompanying digital data to the current geographic position, and
      selectively display the program-accompanying digital data based on a comparison between the geographical location parameters and the current geographic position.

18. The mobile device of claim 17, wherein the processing module is further configured to:
   transmit data from the mobile device based on the comparison between the geographical location parameters and the current geographic position.

19. The mobile device of claim 18, wherein the processing module is further configured to:
   transmit data from the mobile device to request at least one of a product, a service, or additional information associated with at least one of the programs.

20. The mobile device of claim 1, wherein the location-specific information includes at least one of product and service identification available in a location.

21. A method for using a mobile device, comprising:
   receiving programs and program-accompanying digital data at the mobile device;
   determining a current geographic position of said mobile device by the mobile device;
   filtering, by the mobile device, a location-specific information from the program-accompanying digital data based at least on geographical location parameters included in the program-accompanying digital data and on the current geographic position of the mobile device; and
   transmitting the location-specific information from the mobile device to a service center,
   wherein said filtering includes filtering location-specific information from the program-accompanying data based on a user profile stored in said mobile device.

22. The method according to claim 21, wherein said determining includes using a satellite-based positioning system or a terrestrial positioning system.

23. The method according to claim 21, further comprising:
   displaying the location-specific information on the mobile device; and
   selecting the location-specific information by using said mobile device.

24. The method according to claim 21, wherein the transmitting includes activating by the mobile device a resource in the Internet using a URL address included in the location-specific information.

25. The method according to claim 21, further comprising:
   executing by the mobile device program data files included in the location-specific information.

26. The method of claim 25, wherein the executing includes executing at least one Java applet included in the executable program data files.

27. The method of claim 21, further comprising:
   determining if a difference between the geographical location parameters and the current geographic position is within a predefined range, and
   filtering the location-specific information from the program-accompanying digital data when the difference between the geographical location parameters and the current geographic position is within the predefined range.

28. The method according to claim 21, wherein said determining includes obtaining current position indications from a mobile network.

29. The method of claim 21, wherein the programs include radio programs or television programs.

30. The mobile device of claim 5, wherein the program data files include a Java applet.

31. The method of claim 21, further comprising:
   inserting a data storage medium into the mobile device, the data storage medium including user information.

32. The method of claim 21, wherein the transmitting includes transmitting a request for at least one of a product, a service, or additional information associated with at least one of the programs.

33. The mobile device of claim 21, wherein the data is transmitted in accordance with a short message protocol.

34. The method of claim 21, further comprising:
   inserting into the mobile device a removable memory unit including a user profile; wherein said filtering by the mobile device is further based on the user profile.

35. The method of claim 21, wherein the transmitting includes transmitting a request for a product, a service, or additional information associated with the program.

36. The method of claim 21, wherein
   the location-specific information includes an identifier for at least one product, service and information request.

37. The method of claim 21, further comprising:
   comparing the geographical location parameters of the program-accompanying digital data to the current geographic position, and
   selectively displaying the program-accompanying digital data based on a comparison between the geographical location parameters and the current geographic position.

38. The method of claim 21, wherein the location-specific information includes at least one of product and service identification available in a location.

39. A mobile device, comprising:
- a receiver configured to receive programs and program-accompanying digital data, wherein the programs include at least one of audio data and video data, and the program-accompanying digital data includes geographical location parameters;
- a position locating module configured to determine a current geographic position of the mobile device;
- a filter module configured to filter location-specific information from the program-accompanying digital data based at least on the geographical location parameters and the current geographic position of the mobile device; and
- a memory module configured to store a user profile, wherein the filter module is configured to receive the user profile and to filter the location-specific information from the program-accompanying digital data based on the user profile.

40. A method for using a mobile device, comprising:
- receiving programs and program-accompanying digital data at the mobile device, wherein the programs include at least one of audio data and video data, and the program-accompanying digital data includes geographical location parameters;
- determining a current geographic position of said mobile device by the mobile device; and
- filtering, by the mobile device, a location-specific information from the program-accompanying digital data based at least on the geographical location parameters included in the program-accompanying digital data and on the current geographic position of the mobile device,
- wherein said filtering includes filtering location-specific information from the program-accompanying data based on a user profile stored in said mobile device.

\* \* \* \* \*